United States Patent
Bugner et al.

[11] Patent Number: 6,109,324
[45] Date of Patent: *Aug. 29, 2000

[54] METHOD AND APPARATUS FOR PREPARING LABELLED DIGITAL DISC

[75] Inventors: Douglas E. Bugner, Rochester; William J. Staudenmayer, Pittsford; Alfred J. Amell, Spencerport; William J. Mueller, Henrietta, all of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/809,062
[22] PCT Filed: Jun. 17, 1996
[86] PCT No.: PCT/US96/10530
   § 371 Date: Feb. 28, 1997
   § 102(e) Date: Feb. 28, 1997
[87] PCT Pub. No.: WO97/01845
   PCT Pub. Date: Jan. 16, 1997
[51] Int. Cl.⁷ ...................................................... B32B 31/00
[52] U.S. Cl. ..................... 156/378; 156/277; 156/379; 156/384; 156/387; 29/775; 53/411; 53/246; 53/254
[58] Field of Search .............................. 53/246, 254, 238, 53/251, 240, 250, 249, 234, 169, 411; 156/277, 378, 379, 384, 387; 29/773, 775

[56] References Cited

U.S. PATENT DOCUMENTS 4,910,675   3/1990   Burns et al. .
5,285,620   2/1994   Kaye et al. .

FOREIGN PATENT DOCUMENTS 0 277 778   8/1988   European Pat. Off. ........ G11B 27/28
0 297 668   1/1989   European Pat. Off. ......... G06K 1/12
2259685     3/1993   United Kingdom .

*Primary Examiner*—Merrick Dixon
*Attorney, Agent, or Firm*—Doreen M. Wells

[57] ABSTRACT

Methods and apparatus for labelling digital discs. In the method, a disc is provided that has an alignment mark. An image is printed onto the disc in registration with the alignment mark.

10 Claims, 4 Drawing Sheets

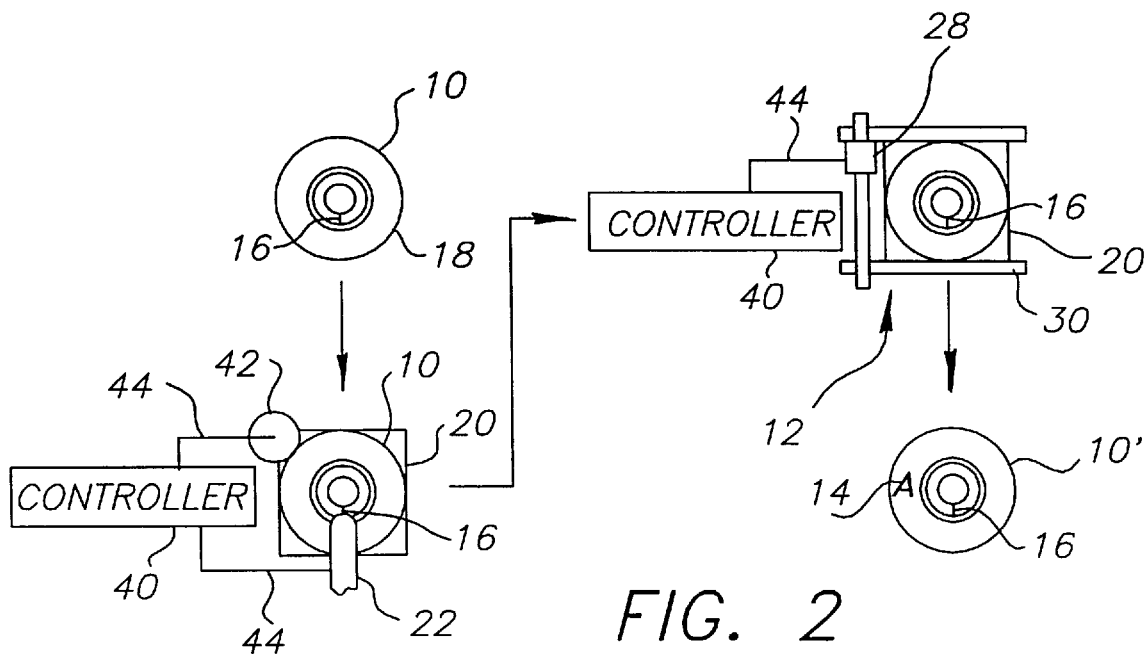
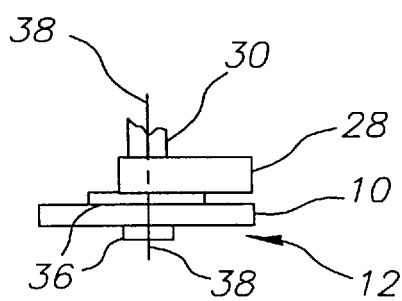
FIG. 3
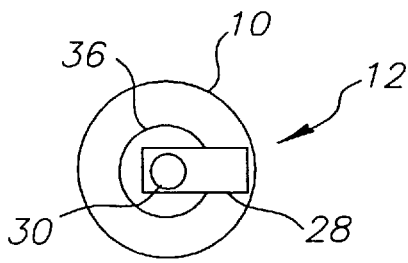
FIG. 4
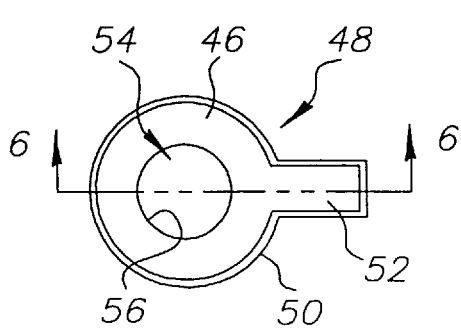
FIG. 5
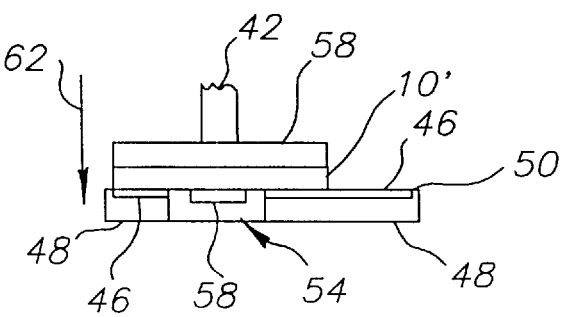
FIG. 6

METHOD AND APPARATUS FOR PREPARING LABELLED DIGITAL DISC

FIELD OF THE INVENTION

The invention relates to methods and apparatus for preparing digital discs, such as compact writable discs. The invention more particularly relates to a method and apparatus for preparing a labelled digital disc.

BACKGROUND OF THE INVENTION

Optical storage media, and particularly the optical disc, is finding increasing use in the high density storage of digital information, such as digitized music, digitized photographs, and computer programs. At present, three principal types of optical storage media are in common use.

The first type, referred to as a CD or ROM (read only memory) disc, is manufactured by pressing depressions into a substrate, in a manner analogous to the manufacture of phonograph records. This type of optical disc has shortcomings similar to those of phonograph records. Prepared recordings must be warehoused until needed and small production runs are subject to an economic disincentive.

A second type of optical storage media, commonly referred to as a writable optical storage disc, has the capability of having information recorded (written) thereon at some time after fabrication of the medium. A third type can also have information added after fabrication, but that information can be erased or modified at a later time. The latter two types of optical storage media lend themselves to small production runs and "on demand" preparation. The ease of preparation of writable and erasable optical storage discs in combination with an elimination of physical storage requirements, suggests their use as a replacement for ROM discs.

It is highly desirable to provide writable and erasable digital discs with labels identifying digital program contents. It is also often desirable to provide uniform features, such as common trade dress, on a series of digital discs differing in program content.

It would thus be desirable to provide apparatus and methods for preparing labelled digital discs from preprinted digital discs.

SUMMARY OF THE INVENTION

The invention provides methods and apparatus for labelling digital discs. In the method, a disc is provided that has an alignment mark An image is printed onto the disc in registration with the alignment mark.

It is an advantageous effect of the invention that apparatus and methods are provided for the preparation of digital discs from unprinted or aligned preprinted discs.

BRIEF DESCRIPTION OF THE FIGURES

The invention itself will be better understood by reference to the following description of an embodiment of the invention taken in conjunction with the accompanying figures wherein:

FIG. 2 is a partial diagrammatical view of another embodiment of the method and apparatus of the invention.

FIG. 3 is a semi-diagrammatical side plan view of a printer of another embodiment of the invention.

FIG. 4 is a semi-diagrammatical top plan view of the printer of FIG. 3.

FIG. 5 is a semi-diagrammatical top plan view of the holder of a printer of another embodiment of the invention.

FIG. 6 is a semi-diagrammatical cross-sectional view of the printer of FIG. 5, taken substantially along line 6—6.

DETAILED DESCRIPTION OF THE INVENTION

The figures provide diagrammatical representations of embodiments of the methods and apparatus of the invention. The following discussion will generally refer to the apparatus, however, the features of the methods of the invention will also be readily apparent from this discussion.

In the methods and apparatus of the invention, a labelled digital disc, is prepared from a blank disc. A disc is provided that has an alignment mark. An image is printed onto the face of the disc in registry with the alignment mark. Digital program content is written onto the disc before or after the printing. The alignment mark can be placed on the disc in a process extraneous to the invention or, in some embodiments of the invention, the alignment mark is added to the disc as a part of a method of the invention. In some embodiments of the invention, first and second images are printed on the disc in registry with the alignment mark.

The term "labelled digital disc" is used hereafter to designate a completed disc-shaped digital information carrier that bears both a program of digital information and a human-readable label identifying that program. The term "blank disc" refers to a digital information carrier that lacks both a program of digital information and a label identifying that program. The blank disc is not necessarily empty of digital information. The blank disc can bear digital information identifying file formats, or providing access to program information, or providing security features or the like. The blank disc can likewise include human or machine-readable information relating to such purposes, for example, a serial number or security code. Digital discs suitable for use in the method and apparatus of the invention have a reading surface, that is transparent to the beam used to read the digital information. Opposite the reading surface is a label surface or face. In a preferred embodiment of the invention, the digital disc is a writable optical disc. In this type of optical storage disc, the data can be written on the disc after the disc is fabricated. A central portion of the disc, referred to herein as the "disc engagement portion," does not bear digital program information and is commonly used for clamping the disc during use.

Figure 1:
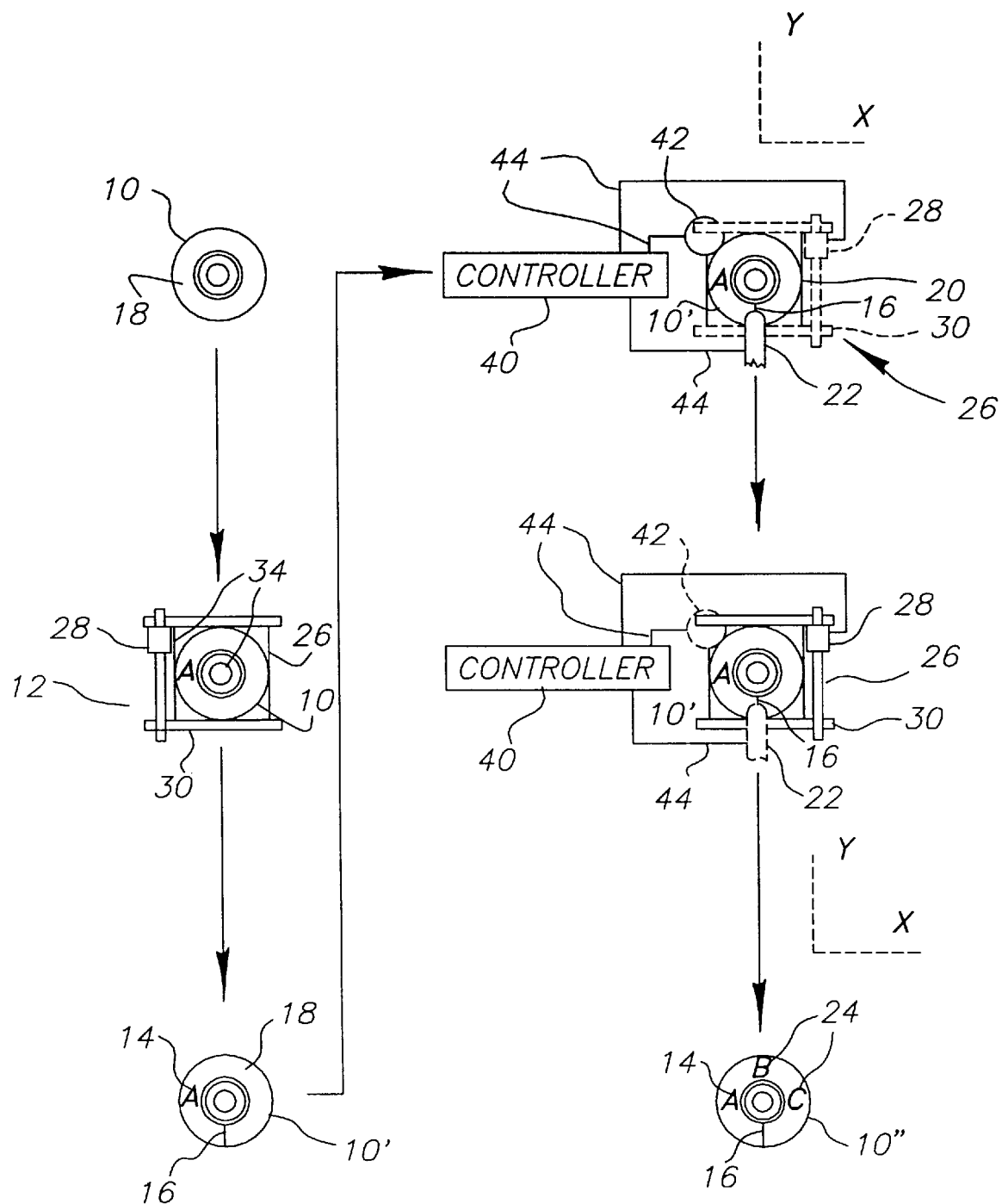
FIG. 1 is a diagrammatical view of an embodiment of the method of the invention. This figure is also illustrative of the apparatus of the invention. Inactive components, that is, the secondary printer and locator in succeeding steps, are indicated by dashed lines.

Currently preferred embodiments of the methods of the invention can be summarized as follows. Referring to FIG. 1, in a first embodiment of the invention, a blank disc 10 is provided and is then printed, in a primary printer 12, with a primary image 14 resulting in a preprinted disc 10'. The primary image 14 includes an alignment mark 16 on the upper surface or face 18 of the disc. After printing, the preprinted disc 10' is removed from the primary printer 12. The preprinted disc 10' is later placed in a station 20 (discussed below in detail). The alignment mark 16 is then found by a locator 22 and a secondary image 24 is deposited by a secondary printer 26 in registry with the alignment mark 16 (and the first image 14) resulting in a labelled disc 10". The registry is not limited to superimposition of two or more features, but rather includes preselected rotational offsets between features. For example, an alignment mark 16 could be offset by an arc of rotation from a feature of the secondary image 24.

Referring now to FIG. 2, in some alternative embodiments of the invention, the disc provided has an alignment mark 16. The alignment mark 16 is located and an image is deposited in registry with the alignment mark 16. If a blank disc 10 is provided (shown in FIG. 2), then the primary image 14 is printed and the resulting product is a preprinted disc 10'. Alternatively, if a preprinted disc 10" is provided (not shown), then the secondary image 24 is printed and the resulting product is a labelled disc 10"'. In a particular embodiment of the invention, the procedure is repeated to print both primary and secondary images 14, and 24 on a disc as shown in FIG. 1.

The esthetic and informational content of the primary and secondary images is limited only by physical requirements of the labelled digital disc, such as thickness, and constraints of the technique used to provide the primary image. The apparatus of the invention combines components necessary to carry out one or more embodiments of the method of the invention.

Referring now to FIG. 1, a blank disc 10 is first "preprinted", a blank disc 10 is provided and a primary image 14 is imposed on the face 18 of the blank disc 10. The primary printer 12 is illustrated in FIG. 1 by a print head 28 mounted on a relative motion device 30 (illustrated in FIG. 1 by an x-y plotter engine) having a platen 26 that receives the blank disc 10. The primary image 14 is printed on the face 18 of the blank disc 10 concentric with or substantially concentric with the axis of the blank disc 10. The primary printer 12 can include various restraints or stops 34 to help ensure accurate positioning of the disc and restrain lateral movement of the disc. Vertical movement is deterred by gravity. The print head 28 is traversed by the relative motion device 30.

In an a alternative primary printer, shown in FIGS. 3–4, the blank disc 10 can be held by a stop or clamp 36. The clamp 36 bears on a central portion of the disc 10 and limits vertical movement of the disc. The disc 10 is rotated by a relative motion device 30 (Device 30 is illustrated in FIGS. 3–4 by a shaft representing a stepper motor or the like.) The disc 10 is rotated relative to a print head 28 about a common axis 38. The print head 28 can be configured to print without further movement (other than -relative rotation of print head and disc) or the print head can be capable of radial movement to print at different radial displacements from the axis 38.

A wide variety of other mechanisms can also be used for the primary printer. Suitable printing techniques include conventional silk screen printing, impact printing, electrophotographic printing, and ink jet printing. Direct printing methods, such as ink jet printing onto the disc, are currently preferred over indirect methods, such as electrophotographic printing onto an intermediate, followed by transfer onto the disc. The primary image can also be imposed on the disc by other means, for example, a sheet of paper or plastic bearing the primary image can be adhered or laminated to the face of the blank disc. The latter techniques are considered to present a greater risk of manufacturing errors and are currently less preferred than printing techniques.

In the method of the invention illustrated in FIG. 1, the primary image 14 can be printed at any relative rotation of the primary image 14 about the axis of the disc, since the alignment mark 16 (also referred to herein as a "printed alignment mark") is a feature of the primary image 14. The printed alignment mark 16 can be a discrete feature superfluous to the pictorial and textural content of the primary image, such as the printed line shown in FIG. 1. The printed alignment mark 16 can also be an inherent feature of the primary image, such as a margin that is disposed radial to the axis of rotation of the disc. If desired, the primary image 14 can consist of the printed alignment mark 16.

After the primary image 14 has been printed, the preprinted disc 10' is removed from the primary printer 12. The preprinted disc 10' can be stored or shipped or otherwise dealt with as appropriate for a particular purpose. Although digital program content can be written to the disc at any time, that is, when the disc is blank or preprinted or labelled; it is convenient to add digital program content to a disc (preprinted with a generalized primary image) contemporaneous with the printing of a secondary image correlated with the digital program content.

Figure 8:
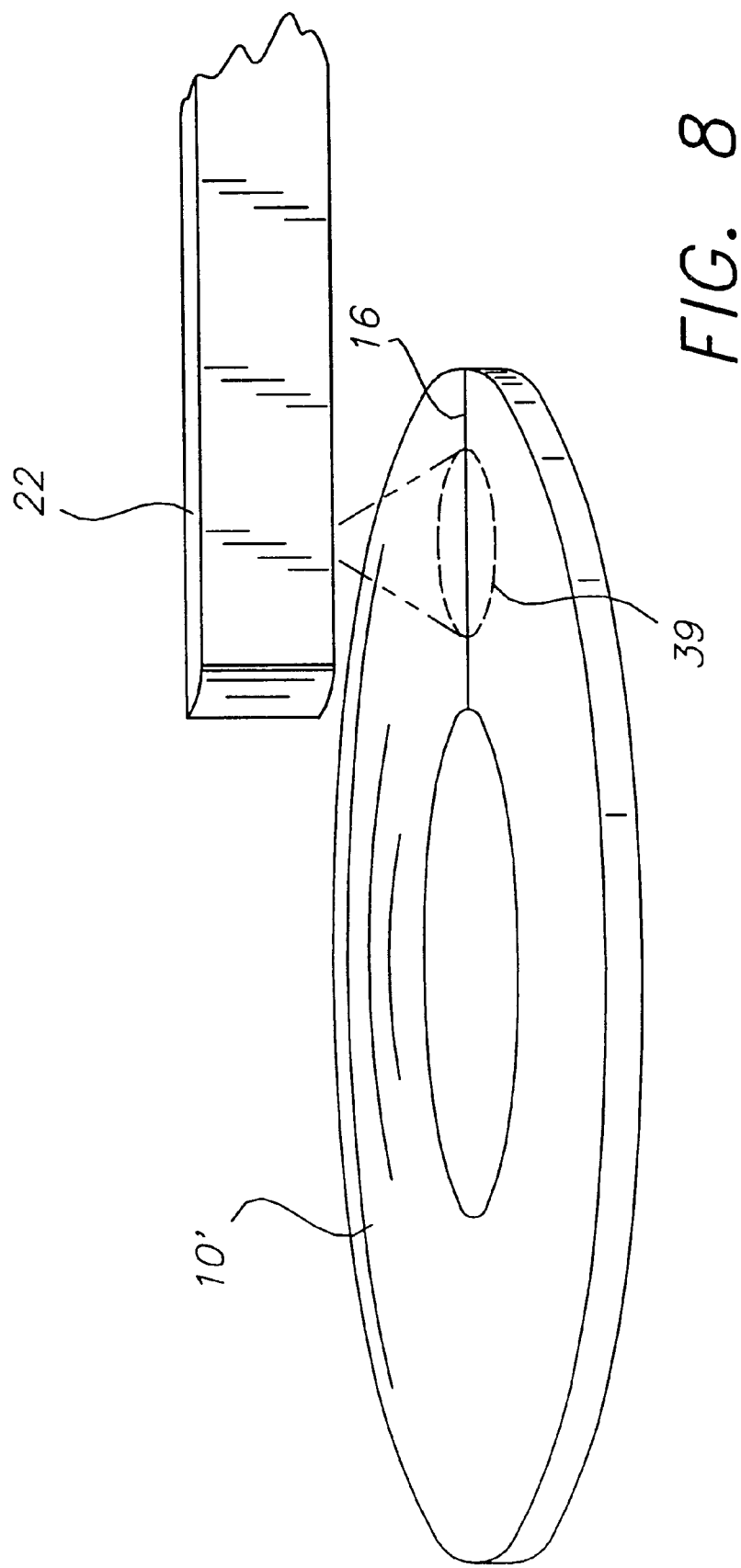
FIG. 8 is a partial perspective view of the station and locator of the apparatus of FIG. 1.

A secondary image 24 is printed over the primary image 14, in registration with both the primary image 14 and the alignment mark 16. The preprinted disc 10' is placed in a disc station 20 and the alignment mark 16 is found using a locator 22. The station 20 defines a plane, indicated by the intersecting lines x-y, perpendicular to the axis of the disc. The plane extends through the face 18 of the disc and the alignment mark 16. As shown in FIG. 8, the alignment mark locator 22 is disposed adjacent the station 20 so as to define a target site 39 in a plane defined by the face 18 of the disc 10'. The target site 39 occupies a known or readily ascertainable position within the operative range of the printhead.

The locator 22, drive 42, and secondary printer 26 are all operatively connected to a controller 40 (indicated in FIG. 1 by signal lines 44). In locating the alignment mark 16, the disc 10' and target site 39 are subjected to relative motion by a drive 42, until the alignment mark 16 occupies the target site 39, as shown in FIG. 8. The locator 22 then signals registration of the alignment mark 16 and the target site 39 to the controller 40. The position of the target site 39 is already known or is then established. The controller 40 causes the secondary printer 26 to deposit the secondary image 24 in a preselected registration with the target site 39 and thus in registration with the alignment mark 16 and with the primary image 14.

The locator 22 can operate in a variety of manners. For example, the locator 22 can scan the entire face of the digital disc 10' raster-fashion, until a mark 16 having particular reflective or transmissive characteristics is identified. In this case, the drive 42 moves the target site 39 while the disc 10' remains stationary. In a currently preferred embodiment of the invention, the locator 22 is disposed in the station 20 at a fixed radial offset from the axis of the disc 10'. The target site 39 of the locator 22 is positioned at this same offset from the axis of the disc 10'. The disc 10' and locator 22 are subjected to relative rotation until the alignment mark 16 is brought into registry with the target site. It is currently preferred to rotate the disc relative to the locator, since the mass of the disc is low.

For example, referring to FIG. 8, the locator 22 can be an optical reader disposed over the disc 10' at the same radial separation from the axis as the alignment mark 16 (which is an optical bar code bar or the like). The reader directs a light beam at the disc, defining the target site 39. The disc is rotated until the alignment mark 16 is aligned with the target site.

Suitable controllers 40, drives 42 and other components of the apparatus of the invention are well known to those skilled in the art. For example, the drive 42 and controller 40 can comprise a stepper motor and microprocessor control system. A wide variety of types of drives can be used. FIG. 1 illustrates a drive which frictionally engages the disc and rotates it relative to the locator 22.

The drive can instead have an axle frictionally engaging the central margin or other portion of the disc. The drive can clamp disc engagement portions, adjoining the central opening and rotate the disc or hold the disc in place while the locator is moved. Specific characteristics of the drive are not critical, as long as the drive is capable of relative positioning of the disc with the accuracy required for a particular purpose.

The locator 22, secondary printer 26, and drive 42 can be permanently mounted over the station 20 in the manner shown in FIG. 1. As FIG. 2 suggests, the locator 22, secondary printer 26, and drive 42 can also be alternated over the station 20 by use of a motion device, a rotary table, sliding rails, or the like (not shown). A wide variety of configurations could be used. For example, a reader could be incorporated into the print head 28 shown in FIGS. 3–4.

After the alignment mark 16 is located, the secondary image is printed on the disc 10' in registry with alignment mark 16 and primary image 14. Resulting in a labelled disc 10".

The types of procedures and mechanisms that can be used for printing the secondary image are substantially as varied as for the printing of the primary image with the exception that the procedures used to print the secondary image must not substantially degrade the primary image. For example, electrophotographic toners are commonly thermoplastic. The fusing of a secondary electrophotographic image over a primary electrophotographic image can be problematic unless fusing conditions are closely controlled. This problem can be prevented, for example, by silk screen printing the primary image, followed by electrophotographic printing of the secondary image.

A particular example of an electrophotographic procedure and apparatus useful for the printing of such a secondary image, is shown in FIGS. 5–6.

A transferable image is deposited onto a transfer sheet by a conventional electrophotographic copier or printer (not shown). The transfer sheet 46 bearing the transferable toner image (not shown) is then placed in a holder 48. Suitable transfer sheets can be made of low surface energy alkyl florophosphonates such as Zaryl™ FSE and Zonyl™ UR or amorphous perfluorocarbons, such as Teflon™ AF 1600 and Teflon™ AF 2400. The Zonyl™ and Teflon™ materials are available from E. I. du Pont de Nemours and Co. The holder 48 has a raised margin 50 that closely receives the transfer sheet 46 and limits lateral motion of the sheet. The holder 48 includes an excess portion 52, that prevents misalignment of the transfer sheet 46 and holder 48. The central area 54 of the holder 52 is recessed or cut away to permit access and the transfer sheet 46 has a matching cutout 56. A disc 10', held to a drive 42 by a clamp 58, has a primary image (not shown) that is placed in registry with a target site. The disc 10' is then lowered into the holder 48 in the direction of arrow 58. The disc 10' and transfer sheet 46 are brought into contact and pressed together between the holder 48 and clamp 58. The holder 48 can include heating elements (not shown). The pressure and heat are applied as necessary to fuse the toner image to the disc. The disc is then withdrawn and the used transfer sheet is separated from the transfered secondary image.

Referring now to FIG. 2, in alternative embodiments of the invention, the alignment mark 16 (also referred to herein as an "inherent alignment mark") is not part of the primary image 14, but instead another feature of the disc 10. For example, the alignment mark 16 can be a radially aligned margin of a bar code or other identification marking embedded into or inscribed on the disc 10. In this embodiment of the invention, both primary and secondary images are radially aligned with the alignment mark. Suitable procedures and devices for these embodiments of the invention are those previously described in relation to the printing of the secondary image 24.

The methods of the invention can be varied to meet the requirements of a variety of uses. For example, blank writable compact discs, can be prepared as preprinted discs with complex or colorful primary images.

Secondary images, in the form of black or monochromatic alphanumeric characters can later be simply applied to identify digital program content. The labelled digital discs can be varied in other manners. For example, a third image or transparent protection layer can optionally be applied over the secondary image.

A program of digital information can be recorded on the disc at any time, however, it is preferred that at least the primary image be provided prior to recording of the digital program. Apparatus for recording, that is, "writing", digital program information on digital media is well known to those skilled in the art. For example, a suitable digital writer for a writable optical disc is a Kodak™ PCD 600 CD Writers marketed by Eastman Kodak Company of Rochester, N.Y.

Image information used in printing the primary and secondary images can be supplied a variety of ways well known to those skilled in the art. Information can be supplied from a hard or floppy disc in a microcomputer. Information can be supplied by a scanner, or the equivalent portion of a copier. Information can be supplied from a remote source via a computer interface. In a particular embodiment of the invention, the controller has a file store. The controller allocates a digital file group, from the store, to a particular disc. The digital file group has a program file group and a label file group. The program file group includes digitized program information and control files necessary to write the program information to the digital disc. The label file group includes digitized label information, and control files necessary to print the label information directly on the digital disc. The controller transmits the program information to the writer for writing on the digital disc. The controller transmits the label information to the printer for printing on the face of the digital disc.

The file store provides the digitizal file group. The term "file group" is used herein to refer to both individual computer files and groups of files having a common or collective function. The file group includes an operational file group, a digital media file group and a print media file group. The operational file group includes the access and distribution control file group and the identification marking file group. The access and distribution control file group provides functions related to initialization or preparation and distribution of appropriate file groups to the writer and printer. The two media file groups each include a code/format file group, a directory file group and a data file group. The code/format file group includes information necessary to configure the writer to recognize the respective data file group, while the directory file group identifies individual files within the respective data file group.

The file store can be any of a wide variety of digital storage media, for example a conventional hard discs and hard disc storage systems, or a multiple disc "juke box" of erasable optical discs. The file store in combination with the controller can comprise an appropriately configured microcomputer. The file store may represent a "permanent" storehouse for digital file groups or can be a temporary buffer that is downloaded with a digital file group when needed. In the latter case, all of the digital file groups can be stored in a "main storehouse", a mainframe computer or the like.

Figure 7:
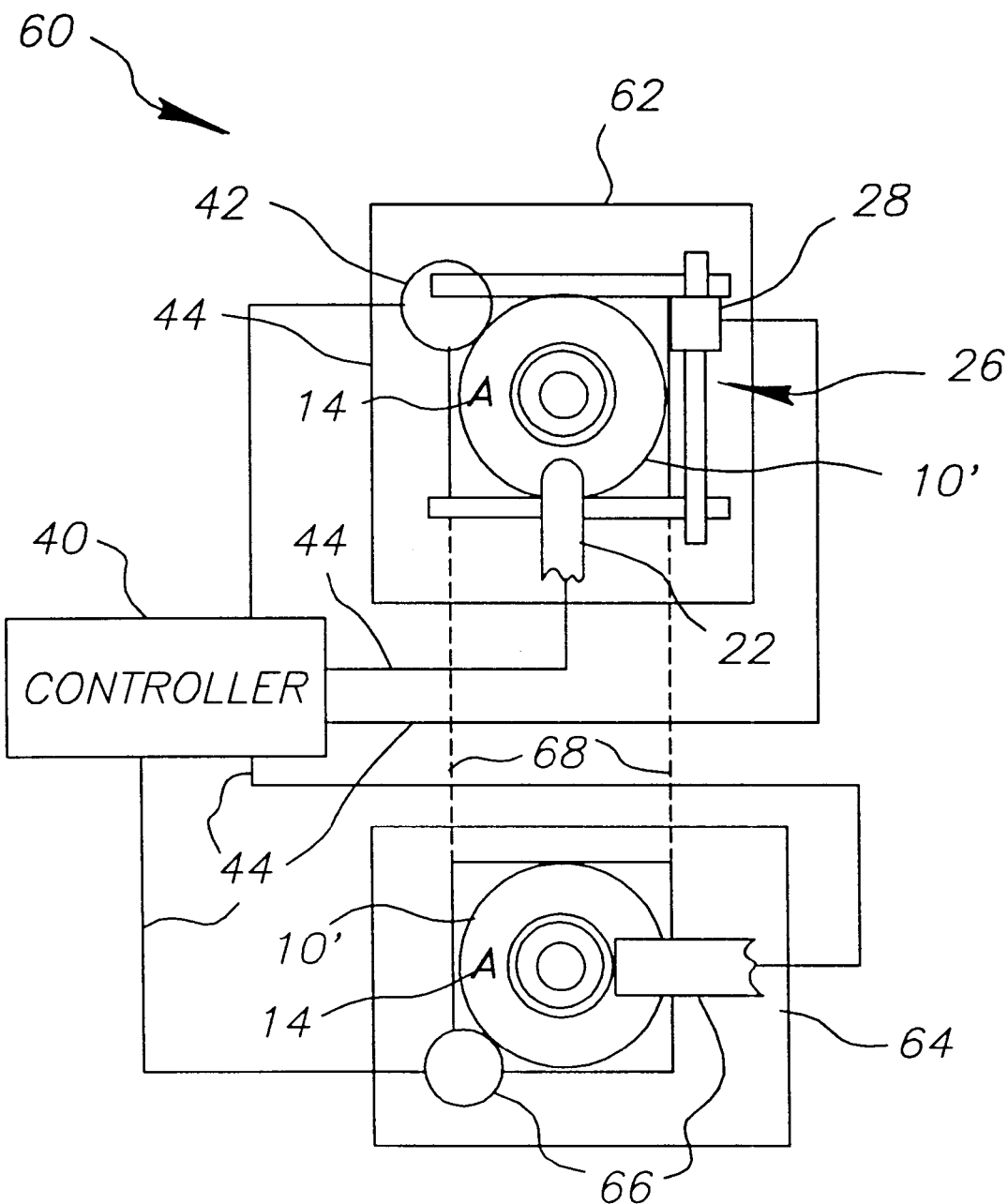
FIG. 7 is a more detailed diagrammatical view of the apparatus of FIG. 1.

An apparatus 60 of the invention is shown in FIG. 7. The apparatus can be used in embodiments of the method of the invention of FIG. 1 or FIG. 2. A first section 62 of the apparatus 60 includes a station 20, locator 22, drive 42, and secondary printer 26. A second section 64 of the apparatus 60 includes a digital writer 66. The locator 22, secondary printer 26, drive 42, and digital writer 66 are operatively connected to the controller 40 by signal lines 44.

The two sections 62,64 are preferably physically isolated so as to deter contamination of writer 66 by colorants used in printer 26. Movement of disc between sections 64,66 is indicated in FIG. 7 by dashed lines 68. The disc can be moved by hand or mechanical means) or by mechanically alternating placement of the printer and writer over the disc station by use of a motion device.

The method and apparatus of the invention are advantageous for use with writable digital discs, since such discs are generally completed one or a few at a time. With the method of the invention, non-specialized information can be pre-printed on a blank disc. The non-specialized information can be printed efficiently in multiple colors in large production runs. The specialized information can also be printed efficiently and inexpensively on an individual disc in a single color, very quickly and inexpensively. For example, the primary image can provide a multicolor background, trademark, and elements of trade dress; while the secondary image can be single color textual information describing an individual program.

Preparing labelled digital disc blank disc 10
primary printer 12
primary image 14
preprinted disc 10'
alignment mark 16
face 18
disc station 20
locator 22
secondary image 24
secondary printer 26
print head 28
relative motion device 30
platen 26
stops 34
clamp 36
common axis 38
target site 39
drive 42
printer 26
controller 40
transfer sheet 46
holder 48
margin 50
excess portion 52
central area 54
matching cutout 56
clamp 58
arrow 58 apparatus 60
second section 64
digital writer 66
signal lines 44
dashed lines 68

We claim:

1. A method for preparing an optical digital disc having a reading surface and a face which comprises printing a primary image and a machine readable alignment mark on the face of the disc, said alignment mark optionally being a feature of the primary image, placing the disc in position for reading of the alignment mark by a locator and for printing a secondary image on the face of the disc, rotating the disc to a printing position in response to the reading of the alignment mark and, printing a secondary image on the face of the disc in preselected registration with a target site, the alignment mark and the primary image.

2. The method of claim 1 further comprising writing digital program content onto the disc.

3. The method of claim 1 wherein the writing is prior to the printing.

4. The method of claim 1 wherein the printing step is further characterized as ink jet printing the primary image onto the disc in registration with the alignment mark.

5. The method of claim 1 wherein the printing step is further characterized as electrophotographically depositing a toner image and transferring the toner image to the disc in registry with the alignment mark.

6. The method of claim 1 wherein the printing step further comprises loading the disc into a station, locating the alignment mark relative to the station, and depositing the secondary image relative to the alignment mark.

7. Apparatus for printing label information on the face of a digital disc having an alignment mark, the apparatus comprising:

a station receiving the digital disc, the station defining a plane perpendicular to the axis of the disc, the plane extending through the alignment mark;

a locator disposed in operative relation to the disc station, the locator defining a target site on the plane;

means for altering the relative positions of the alignment mark and the target site on the plane;

means for signaling registration of the alignment mark and the target site; and a printer responsive to the means for signaling registration for printing an image on the disc in positional correlation with the target site.

8. The apparatus of claim 7 further comprising:

a writer for recording digital program content on the recording surface of the disc;

a printer for printing label information on the face of the disc, a controller allocating a digital file group to the digital disc, the digital file group having a program file group and a label file group, the program file group having digitized program information and control information necessary to write the program information to the digital disc, the label file group having digitized label information and control information necessary to print the label information on the digital disc, the controller supplying the program file group to the writer, the controller supplying the label file group to the printer.

9. A method for preparing an optical digital disc having a face which comprises:

printing a primary image and a machine-readable alignment mark on the face of the disc, said alignment mark optionally being a feature of the primary image, placing the disk in position for reading of the alignment mark by a locator and for printing a secondary image on the face of the disc, subjecting said disc and secondary image to relative rotation until the secondary image is brought into registry with a target site, printing a secondary image on the face of the disc in preselected registration with the target site, the alignment mark and the primary image.

10. A method for preparing an optical digital disc having a face which comprises:

printing a primary image and a machine-readable alignment mark on the face of the disc, said alignment mark optionally being a characteristic of the primary image, placing the disc in position for reading of the alignment mark by a locator and for printing a secondary image on the face of the disc, subjecting said disc and secondary image to relative rotation until the secondary image is brought into registry with a target site, printing a secondary image on the face of the disc in preselected registration with the target site, the alignment mark and the primary image.

* * * * *